Patented Oct. 3, 1939

2,175,049

UNITED STATES PATENT OFFICE 2,175,049

POLYVINYL HALIDE COMPOSITIONS

Claude H. Alexander, Cuyahoga Falls, Ohio, assignor to The B. F. Goodrich Company, New York, N. Y., a corporation of New York No Drawing. Application September 3, 1937, Serial No. 162,333

11 Claims. (Cl. 260—88)

This invention relates to polyvinyl halides, and has as its object to provide polyvinyl halide compositions with improved dielectric properties.

Polyvinyl halides in general and plasticized gamma polyvinyl chlorides in particular are very desirable materials for electrical insulation because they are extraordinarily resistant to water, oils, and other solvents, they can be easily applied to conductors by a number of methods, and the mechanical properties of the compositions can be varied over a wide range by changing the proportion of the plasticizer. The preparation of these compositions is disclosed in detail in U. S. Patent No. 1,929,453 issued to Waldo L. Semon.

I have discovered that the dielectric properties of polyvinyl halides are greatly improved by the concurrent presence in the compositions of lead or compounds containing cationic lead and sulfur or sulfur compounds containing bivalent or tetravalent sulfur. The term "cationic lead" is used to mean lead which has combined with other elements as a cation. The specific examples will employ plasticized gamma polyvinyl chlorides since these compositions offer the greatest commercial promise, although the invention is as readily applicable to the alpha, beta, or delta polyvinyl chlorides and the other polyvinyl halides.

In one embodiment of my invention, the free or combined lead and the free or combined sulfur are added to a plasticized composition. For instance, a composition containing 7 parts by weight of sulfur, 1 part of weight of finely-divided lead having a particle size of 3 microns or less, and 250 parts of plasticized polyvinyl chloride may be prepared.

In place of the lead may be substituted a great number of compounds containing cationic lead, including the various lead oxides, lead sulfide, lead sulfate, lead nitrate, lead chloride, lead acetate, tetraphenyl lead, tetraethyl lead, triethyl lead chloride, lead oleate, lead stearate, lead oxalate, lead silicate, etc. The lead or lead compounds may advantageously be used in proportions as low as .5% or less and as high as 10% or over. Compounds containing lead combined only as an anion such as sodium plumbate are without the scope of this invention.

There are a very great number of compounds through which the bi- or tetravalent sulfur may be supplied to the composition. The compound may be one such as lead sulfide in which the lead and sulfur are combined. A combination of free sulfur and lead sulfide or indeed of free sulfur and any sulfur compound may be used. Suitable bivalent sulfur compounds include not only metallic sulfides, but also organic sulfur compounds such as thioalcohols, thioethers, thioesters, thioaldehydes, thioacids, thiocarbamates, mercaptothiazoles, and thiuram sulfides, particularly compounds which are di- or polysulfides. Although the bivalent sulfur compounds are preferred to those having four valences, tetravalent compounds such as the metallic sulfites, particularly lead sulfite, may be used.

A most useful embodiment of my invention in the combination of lead, lead oxide, or a lead salt such as lead silicate with a plasticizer containing bi- or tetravalent sulfur, which combination obviates the necessity of using any other plasticizer and produces compositions having superior dielectric properties. The plasticizer may also contain free sulfur, especially the monoclinic form which is usually conceded to bivalent. Suitable sulfur-containing plasticizers include the thianthrenes such as 2,6 dimethyl thianthrene, and the organic sulfides such as amyl-beta-naphthyl sulfide, cyclohexyl beta-naphthyl sulfide, diamyl thiodiglycollate, and dibenzyl ether of thio diglycol. From one half to four parts or more by weight of the sulfur-containing plasticizers are usually used.

Materials such as carbon black, zinc oxide, clay, barytes, wood flour, and other pigments and fillers commonly used in the rubber and plastics industries may also be included in the polyvinyl halide compositions.

As a specific embodiment of my invention, I will show how the dielectric properties of polyvinyl chloride compositions may be improved by using lead compounds in conjunction with 2,6 dimethyl thianthrene. I prepared a composition containing gamma polyvinyl chloride 56 parts by weight, 2,6 dimethyl thianthrene 42 parts, and precipitated lead silicate 2 parts, and homogenized the mixture on a heated mill. The values for the power factors of this composition at various temperatures are as follows:

| Temperature (deg. C.) | 30 | 40 | 50 | 70 | 90 | 100 |
|---|---|---|---|---|---|---|
| Power factor (%) at 1000 cycles | 11.6 | 12.6 | 10.8 | 3.6 | 2.0 | 1.6 |

It can be readily seen that the power factor is very small at high temperatures. It is especially noteworthy that at 100° C., the power factor is still decreasing, a condition which I have never obtained without using the method of this invention.

As another specific example, a composition was prepared containing gamma polyvinyl chloride 50.9 parts by weight, 2,6 dimethyl thianthrene 39.1 parts, litharge 5.0 parts, and carbon black 5.0 parts. The excellent dielectric properties of the composition are shown by the following:

| Temperature (deg. C.) | 30 | 40 | 50 | 70 | 90 | 100 |
|---|---|---|---|---|---|---|
| Power factor (%) at 1000 cycles | 10.6 | 12.6 | 12.3 | 4.8 | 2.2 | 1.8 |

The extremely low power factor at high temperatures allows the compositions of my invention to be used as insulation in many places where former polyvinyl halide compositions could not profitably be employed.

Although I have herein disclosed specific embodiments of my invention, I do not limit myself wholly thereto, for many modifications such as the substitution of equivalent materials and the variation of proportions used are within the spirit and scope of the invention as defined in the appended claims.

I claim:

1. The method of preparing gamma polyvinyl chloride having good dielectric properties which comprises incorporating therewith litharge and a thianthrene.

2. The method of preparing gamma polyvinyl chloride having good dielectric properties which comprises incorporating therewith litharge and 2,6 dimethyl thianthrene.

3. The method of preparing gamma polyvinyl chloride having good dielectric properties which comprises incorporating therewith litharge, carbon black, and 2,6 dimethyl thianthrene.

4. The method of preparing gamma polyvinyl chloride having good dielectric properties which comprises incorporating therewith a lead salt and a thianthrene.

5. The method of preparing gamma polyvinyl chloride having good dielectric properties which comprises incorporating therewith lead silicate and 2,6 dimethyl thianthrene.

6. The method of preparing gamma polyvinyl chloride having good dielectric properties which comprises incorporating therewith lead sulfide and 2,6 dimethyl thianthrene.

7. A composition of matter comprising gamma polyvinyl chloride, lead silicate, and 2,6 dimethyl thianthrene, said composition having good dielectric properties.

8. A composition of matter comprising gamma polyvinyl chloride, litharge, and 2,6 dimethyl thianthrene, said composition having good dielectric properties.

9. A composition of matter comprising gamma polyvinyl chloride, lead sulfide, and 2,6 dimethyl thianthrene, said composition having good dielectric properties.

10. The method of preparing polyvinyl chloride having good dielectric properties which comprises incorporating therewith a compound containing cationic lead and a thianthrene.

11. A composition of matter comprising a polyvinyl halide, a compound containing cationic lead, and a thianthrene, said composition having good dielectric properties.

CLAUDE H. ALEXANDER.